United States Patent [19]

Morita et al.

[11] Patent Number: 4,497,516
[45] Date of Patent: Feb. 5, 1985

[54] SEALING ASSEMBLY FOR AUTOMOTIVE FRONT-PILLAR AND SIDE-DOOR ARRANGEMENT

[75] Inventors: Yoshinori Morita, Yokohama; Yutaka Ohmura, Fujisawa, both of Japan

[73] Assignee: Nissan Motor Company, Limited, Yokohama, Japan

[21] Appl. No.: 395,115

[22] Filed: Jul. 6, 1982

[30] Foreign Application Priority Data

Aug. 4, 1981 [JP] Japan .......................... 56-116063[U]

[51] Int. Cl.³ .............................................. B62D 27/04
[52] U.S. Cl. ................................... 296/206; 411/182; 411/508; 24/289; 49/383
[58] Field of Search ...................... 296/84 D, 201, 202, 296/206, 93; 411/182, 508, 509, 510; 24/289, 290, 297; 52/507, 511; 49/383, 492, 496

[56] References Cited

U.S. PATENT DOCUMENTS

| | | | |
|---|---|---|---|
| 2,733,096 | 1/1956 | Waterhouse et al. | 296/202 |
| 2,836,215 | 5/1958 | Rapata | 24/297 |
| 2,853,913 | 9/1958 | Rapata | 411/508 |
| 3,701,373 | 10/1972 | Wronke et al. | 411/182 |
| 4,322,105 | 3/1982 | Onda | 296/93 |
| 4,354,566 | 10/1982 | Yuda | 293/155 |

Primary Examiner—Robert B. Reeves
Assistant Examiner—Dennis H. Pedder
Attorney, Agent, or Firm—Lane, Aitken & Kananen

[57] ABSTRACT

A sealing assembly for a front-pillar and side-door arrangement of an automotive vehicle, the pillar and door arrangement including a front pillar having a wall portion formed with an opening and a side-door sash assembly including a front portion extending along the front pillar and spaced apart from the wall portion of the pillar, the sealing assembly comprising a flexible sealing member having an inner portion attached to the front pillar and an outer portion warped from the outer portion and held in elastically pressing contact with the front portion of the side-door sash assembly, the sealing member being formed with an opening in the inner portion thereof, and a snap element having a head portion passed through the opening in the sealing member and a stem portion projecting into the front pillar through the opening in the wall portion of the pillar and smaller in cross sectional area than the head portion so that the head portion has adjacent to the stem portion an end face which is held in contact with the outer surface of the wall portion of the front pillar.

4 Claims, 4 Drawing Figures

4,497,516

SEALING ASSEMBLY FOR AUTOMOTIVE FRONT-PILLAR AND SIDE-DOOR ARRANGEMENT

FIELD OF THE INVENTION

The present invention relates to a front-pillar and side door arrangement of an automotive vehicle and, more particularly, to a sealing assembly for use in the front-pillar and side-door arrangement.

SUMMARY OF THE INVENTION

In accordance with the present invention, there is provided a sealing assembly for a front-pillar and side-door arrangement of an automotive vehicle, the front-pillar and side-door arrangement including a front pillar forming part of the body structure of the vehicle and having a wall portion formed with an opening and a side-door sash assembly including a front portion extending along the front pillar and spaced apart from the aforesaid wall portion of the pillar, the sealing assembly comprising a flexible sealing member having an inner portion attached to the front pillar and an outer portion warped from the outer portion and held in elastically pressing contact with the front portion of the side-door sash assembly, the sealing member being formed with an opening in the inner portion thereof; and a snap element having a head portion passed through the opening in the sealing member and a stem portion projecting into the front pillar through the opening in the above mentioned wall portion of the pillar and smaller in cross sectional area than the head portion so that the head portion has adjacent to the stem portion an end face which is held in contact with the outer surface of the wall portion of the front pillar. In a sealing assembly thus constructed and arranged in accordance with the present invention, the snap element may further have a hook portion formed on the stem portion and extending away from the leading end of the stem portion toward the head portion, the hook portion being held in elastically pressing contact with the inner surface of the wall portion of the front pillar at its end adjacent to the head portion of the snap element, and a flange portion surrounding the head portion at the end of the snap element opposite to the stem portion and held in contact with the outer surface of the aforesaid inner portion of the sealing member. The above mentioned snap element is preferably formed with an internally threaded blind bore which is open toward the door structure, the sealing assembly further comprising a threaded fastening element fitted to the snap element through the blind bore in the snap element. In this instance, the sealing assembly according to the present invention may further comprise a front window molding having a portion securely attached to the snap element by means of the fastening element.

BRIEF DESCRIPTION OF THE DRAWINGS

Drawbacks of a prior-art sealing assembly for a front-pillar and side-door arrangement of an automotive vehicle and detailed features of a sealing assembly according to the present invention will be understood from the following description taken in conjunction with the accompanying drawings, in which.

DESCRIPTION OF THE PRIOR ART

Figure 1:
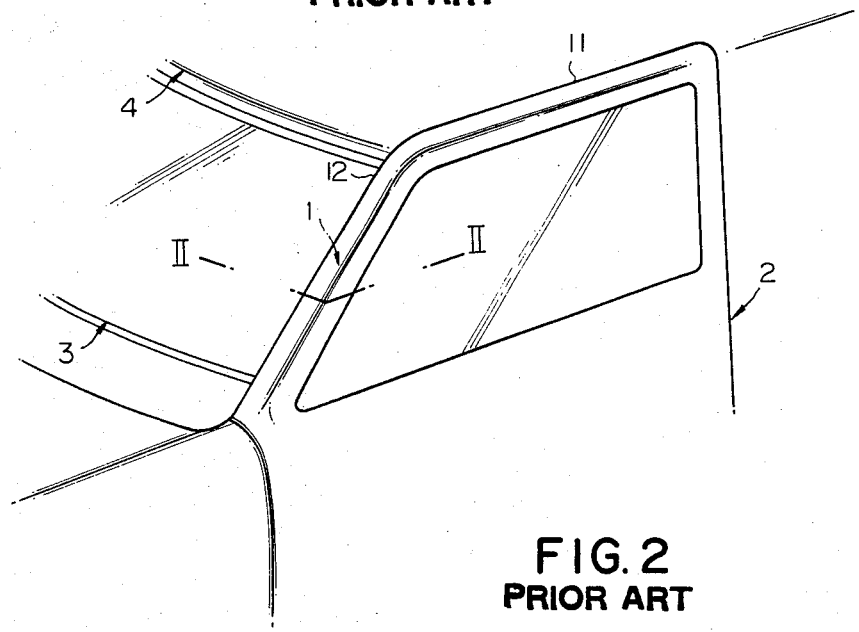
FIG. 1 is a fragmentary perspective view showing a front portion of the body structure of an automotive vehicle having a front-pillar and side-door arrangement including a prior-art sealing assembly.
Figure 2:
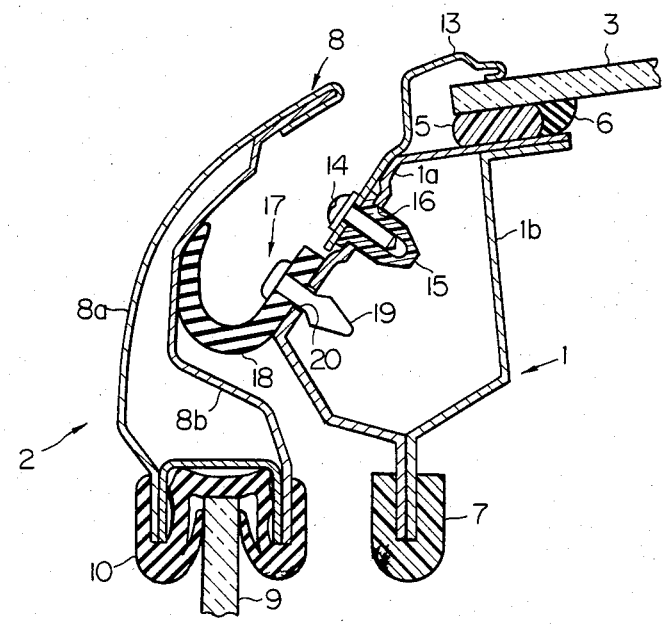
FIG. 2 is a cross sectional view showing the front-pillar and side-door arrangement of the vehicle illustrated in FIG. 1, the cross section being taken on a plane indicated by lines II—II in FIG. 1.

In FIGS. 1 and 2 of the drawings, a front-pillar and side-door arrangement of an automotive vehicle having a known sealing assembly for the front-pillar and side-door arrangement is shown including a front pillar 1 (FIG. 2) forming part of a vehicle body and a front door structure 2 (FIG. 1) hingedly connected to the vehicle body. The front pillar 1 extends along a side end portion of a front windshield 3 and upwardly terminates in a front end portion of a roof panel 4 (FIG. 1). As shown in FIG. 2, the front pillar 1 is composed of outer and inner panel members 1a and 1b partially spaced apart from each other and having respective front and rear end portions securely connected together by suitable fastening means (not shown). The front windshield 3 has a side edge portion securely attached to the pillar 1 by means of an adhesive sealing compound 5 with a dam rubber element 6 interposed between the panel 1a and the windshield 3 so as to prevent the sealing compound 5 from overflowing to an uncovered area of the windshield 3 beyond the rubber element 6. The rear end portions of the outer and inner panel members 1a and 1b of the pillar 1 are trimmed with a welt 7. On the other hand, the front door structure 2 is of the press-formed type and, thus, has an upper side-door sash assembly 8 composed of outer and inner panel members 8a and 8b as shown in FIG. 2, the panel members 8a and 8b being integral with lower panel portions of the door structure 2. The outer and inner panel members 8a and 8b have front end portions securely coupled together and have rear end portions spaced apart from each other on both sides of a front end portion of a window panel 9. The window panel 9 has its front end portion slidably fitted to the outer and inner panel members 8a and 8b of the side-door sash assembly 8 by means of a glass-run rubber strip 10. Furthermore, the side-door sash assembly 8 of the front door structure 2 has an upper horizontal portion 11 longitudinally extending along a side edge portion of the roof panel 4 as will be seen from FIG. 1, and an inclined front portion 12 longitudinally extending along the outer panel member 1a of the pillar 1 and in part located in front of the pillar 1 as will be seen from the illustrations of FIGS. 1 and 2. A front window molding 13 is attached to the outer panel member 1a of the pillar 1 by screws 14 fitted to the panel member 1a through rubber grommets 15 passed through openings 16 in the panel member 1a. The window molding 13 is arranged to have a front end portion covering a side marginal portion of the windshield 3 as shown in FIG. 2.

In the front-pillar and side-door arrangement of the nature above described, the front pillar 1 and the front side-door sash assembly 8 are sealed to each other by means of a sealing assembly 17 provided between the outer panel member 1a of the pillar 1 and the inner panel member 8b of the side-door sash assembly 8 as shown in FIG. 2. The sealing assembly 17 comprises a weather strip 18 having a portion attached to the outer panel member 1a of the pillar 1 by means of clip elements 19 and a portion held in pressing contact with the inner panel member 8b of the side-door sash assembly 8. The clip elements 19 are passed through openings 20 formed in the outer panel member 1a of the pillar 1 so that the weather strip 18 is elastically deformed under compression between the panel member 1a of the pillar 1 and the head portion of the clip element 19.

Since the weather strip 18 is thus fitted to the pillar 1 by means of the clip elements 19 in the prior-art sealing assembly 17, the compressive force exerted on the weather strip 18 can not be adjusted strictly. If the weather strip 18 is compressed excessively, the clipped portion of the weather strip 18 is caused to produce a permanent strain and would deteriorate the sealing performance of the weather strip 18. Furthermore, provision of a number of openings including the openings 16 and 20 in the outer panel member 1a of the pillar 1 increases the chances of leaks into the pillar 1 and accordingly deteriorates the sealing performance of the sealing assembly 17 as a whole. A problem is further encountered in that the window molding 13 held in direct contact with the outer panel member 1a of the pillar 1 tends to produce rust on the panel member 1a and the molding 13.

The present invention contemplates elimination of these problems which have been inherent in a prior-art sealing assembly of a front-pillar and side-door arrangement of an automotive vehicle.

DESCRIPTION OF THE PREFERRED EMBODIMENT

Figure 3:
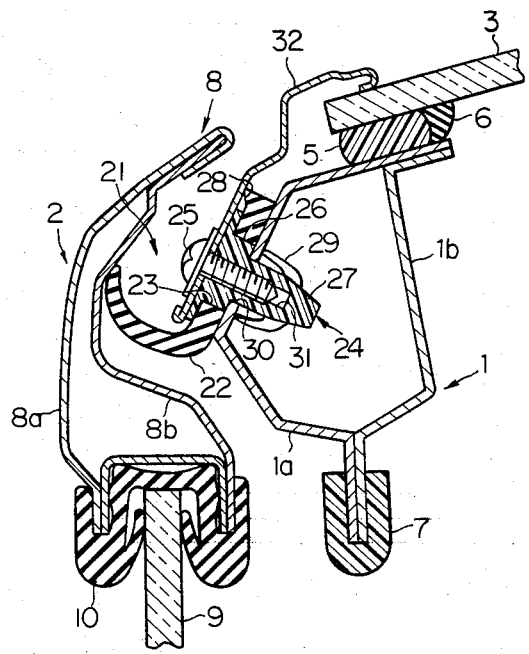
FIG. 3 is a view similar to FIG. 2 but which shows a front pillar including a preferred embodiment of a sealing assembly according to the present invention.

In FIG. 3 of the drawings, a front-pillar and side-door arrangement of an automotive vehicle including a sealing assembly embodying the present invention is shown constructed similarly to the front-pillar and side-door arrangement hereinbefore described with reference to FIGS. 1 and 2 and, thus, comprises a front pillar 1 and a front door structure 2 hingedly connected along its front vertical end to the vehicle body. The front pillar 1 upwardly terminates in a front end portion of a roof panel (not shown) and constitutes one of the two front pillars horizontally spaced apart in parallel from each other with a front windshield 3 provided therebetween. The front pillar 1 is composed of outer and inner panel members 1a and 1b partially spaced apart from each other and having front and rear end portions securely connected together by suitable fastening means (not shown). The front windshield 3 has a side edge portion having an inner surface securely attached to the outer panel member 1a of the pillar 1 by means of an adhesive sealing compound 5 with a dam rubber element 6 interposed between the panel 1a and the windshield 3 to prevent the sealing compound 5 from overflowing to an uncovered area of the windshield 3 beyond the rubber element 6. The rear end portions of the outer and inner panel members 1a and 1b of the pillar 1 are trimmed with a welt 7. On the other hand, the front door structure 2 is assumed to be of the press-formed type as in the front-pillar and side-door arrangement described with reference to FIGS. 1 and 2 and, thus, has an upper side-door sash assembly 8 composed of outer and inner panel members 8a and 8b which are respectively integral with outer and inner lower panel portions of the door structure 2. The outer and inner panel members 8a and 8b of the side-door sash assembly 8 have front end portions securely coupled together in a suitable manner and have rear end portions spaced apart from each other on both sides of a front end portion of a window panel 9 which forms part of the door structure 2. The front end portion of each of the outer and inner panel members 8a and 8b extends along the front pillar 1 and is spaced apart from a wall portion of the front pillar 1, viz., the outer panel member 1a of the pillar 1. The window panel 9 has its front end portion slidably fitted to the outer and inner panel members 8a and 8b of the side-door sash assembly 8 by means of a glass-run rubber strip 10. Though not shown in FIG. 3, furthermore, the side-door sash assembly 8 of the front door structure 2 has an upper horizontal portion longitudinally extending along a side edge portion of the roof panel, and an inclined front portion longitudinally extending along the outer panel member 1a of the pillar 1 and in part located in front of the pillar 1 as described in connection with the side-door sash assembly 8 shown in FIG. 1.

In the front-pillar and side-door arrangement above described, the front pillar 1 and the front side-door sash assembly 8 are sealed to each other by means of a sealing assembly 21 provided between the outer panel member 1a of the pillar 1 and the inner panel member 8b of the side-door sash assembly 8. The sealing assembly 21 comprises an elastic sealing member constituted by a weather strip 22 having an inner portion formed with openings 23 and securely attached to the outer panel member 1a of the pillar 1 by means of snap elements 24 and screws 25 and an outer portion warped from the inner portion and held in elastically pressing contact with the inner panel member 8b of the side-door sash assembly 8.

Figure 4:
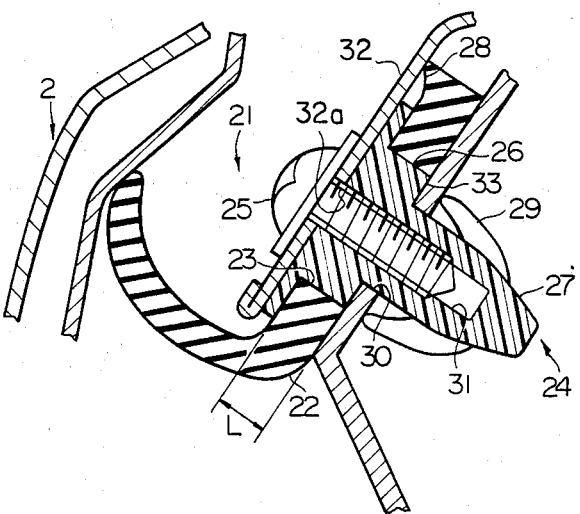
FIG. 4 is a fragmentary sectional view showing, to an enlarged scale, the sealing assembly in the front pillar shown in FIG. 3.

As will be better seen from FIG. 4 of the drawings, each of the snap elements 24 is constructed of an elastic material such as rubber and has a head portion 26, a stem portion 27 axially extending from the head portion 26, a flange portion 28 coaxially surrounding the head portion 26 at the axial end of the head portion 26 opposite to the stem portion 27, and a hook portion 29 formed on the stem portion 27 and extending away from the leading end of the stem portion 27 toward the head portion 26. The aforesaid wall portion of the outer panel member 1a, viz., the outer panel member 1a of the pillar 1 is formed with openings 30 through which the individual snap elements 24 are fitted to the panel member 1a with the head portion 26 of each of the snap elements 24 axially passed through each of the openings 23 in the weather strip 22 and the stem portion 27 of each snap element 24 axially passed through each of the openings 30 in the panel member 1a. The hook portion 29 of each of the snap elements 24 thus fitted to the panel member 1a of the pillar 1 is held in elastically pressing engagement at its end with the inner surface of the panel member 1a so that the snap element 24 is prevented from being removed or dislodged from the panel member 1a. Each of the snap elements 24 is, furthermore, formed with an internally threaded blind bore 32 which is open at the axially outer end of the flange portion 28 toward the inner panel member 8b of the side-door sash assembly 8.

A front window molding 32 has a rear end portion formed with openings 32a and securely attached to the outer end faces of the respective flange portions 28 of the individual snap elements 24 by means of the above mentioned screws 25. Thus, the flange portion 28 of each of the snap elements 24 is held in contact with the outer surface of the inner portion of the weather strip 22. Each of the screws 25 constitutes a threaded fastening element having a head portion and a stem portion axially extending from the head portion and inserted through each of the openings 32a in the window molding 32 into the blind bore 31 in each of the snap elements 24 as shown. The flange portion 28 of each snap element 24 is, thus, closely pressed between the outer surface of the inner portion of the weather strip 22 and the inner surface of the window molding 32 and, as a consequence, the weather strip 22 has portions closely pressed between the outer panel member 1a of the pillar 1 and the inner end face of a flange portion 28 of each snap element 24. As in the front-pillar and side-door arrangement described with reference to FIGS. 1 and 2, the window molding 32 is arranged to further have a front end portion covering a side marginal portion of the windshield 3 as shown in FIG. 3.

The head portion 26 of each snap element 24 is larger in cross sectional area than the stem portion 27 of each snap element 24 and has an annular end face 33 adjacent the stem portion 27. The end face 33 of the head portion 26 is held in close contact with the outer surface of the outer panel member 1a of the pillar 1. The compressive force exerted on the weather strip 22 is thus dictated by the distance between the end face 33 and the inner end face of the flange portion 28 and can be selected accurately by properly selecting the axial length (indicated by L in FIG. 4) of the head portion 26 of the snap element 24 depending upon the thickness of the weather strip 22. The weather strip 22 can be fitted to the pillar 1 with proper and uniform compressive forces and are therefore prevented from producing a permanent strain therein. Furthermore, the front window molding 32 is attached to the pillar 1 through the weather strip 22 and the snap elements 24 so that the sealing performance of the sealing assembly 21 is improved considerably and the front window molding 32 is prevented from producing rust on the panel member 1a of the pillar 1. Because, in addition, of the fact that both the window molding 32 and the weather strip 22 are fitted to the pillar 1 commonly through the openings 30 in the panel member 1a of the pillar 1, the width of the front pillar 1 can be reduced and the chances of leaks into the pillar 1 are reduced significantly. The sealing performance of the sealing assembly 21 as a whole is for these reasons improved to a considerable degree.

What is claimed is:

1. A sealing assembly for a front-pillar and side-door arrangement of an automotive vehicle, the front-pillar and side-door arrangement including a front pillar having a wall portion formed with an opening, a front window molding having a portion located adjacent to said wall portion and formed with an opening substantially aligned with the opening in said wall portion, and a side-door sash assembly spaced apart from said wall portion, the sealing assembly comprising:

a flexible sealing member having an inner portion securely intervening between the outer surface of the wall portion and the inner surface of the window molding and an outer portion warped from the inner portion and held in elastically pressing contact with said side-door sash assembly, the sealing member being formed with an opening in the inner portion thereof; and a snap element passed through the opening in the sealing member and projecting into the front pillar through the opening in said wall portion for securing the inner portion of said sealing member between said window molding and said wall portion, wherein said snap element has a head portion passed through the opening in the sealing member and a stem portion projecting into the front pillar through the opening in said wall portion of the front pillar and smaller in cross sectional area than said head portion so that the head portion has adjacent to the stem portion an end face which is held in contact with the outer surface of said wall portion of the front pillar, said head portion of said snap element intervening between the outer surface of said wall portion of the front pillar and the inner surface of the window molding portion located adjacent to said wall portion so that said portion of the window molding is spaced apart from the outer surface of the wall portion of the front pillar, said snap element being formed with a blind bore which extends at least in said head portion of the snap element and which is open toward said front end portion of said side-door sash assembly.

2. A sealing assembly for a front-pillar and side-door arrangement as set forth in claim 1, further comprising a threaded fastening element fitted into said snap element through said blind bore and securing said portion of said front window molding to said snap element.

3. A sealing assembly for a front-pillar and side-door arrangement as set forth in claim 2 in which said snap element further has a flange portion surrounding said head portion at the end of the snap element opposite to said stem portion and closely received between said inner portion of said sealing member and said front window molding so that said portion of the front window molding is spaced apart from the outer surface of said wall portion across said inner portion of said sealing member and said flange portion of said snap element, said blind bore in the snap element being open toward said side-door sash assembly through said flange portion.

4. A sealing assembly for a front-pillar and side-door arrangement as set forth in claim 2 in which said snap element further has a hook portion formed on said stem portion and extending away from the leading end of the stem portion toward said head portion, said hook portion being held in elastically pressing contact with the inner surface of said wall portion of the front pillar at its end adjacent to the head portion of the snap element, and a flange portion surrounding said head portion at the end of the snap element opposite to said stem portion and closely received between said inner portion of said sealing member and said front window molding so that said portion of the front window molding is spaced apart from the outer surface of said wall portion of said front pillar across said inner portion of said sealing member and said flange portion of said snap element, said blind bore in the snap element being open toward said front end portion of said side-door sash assembly through said flange portion.

* * * * *